United States Patent Office 3,102,261
Patented Aug. 27, 1963

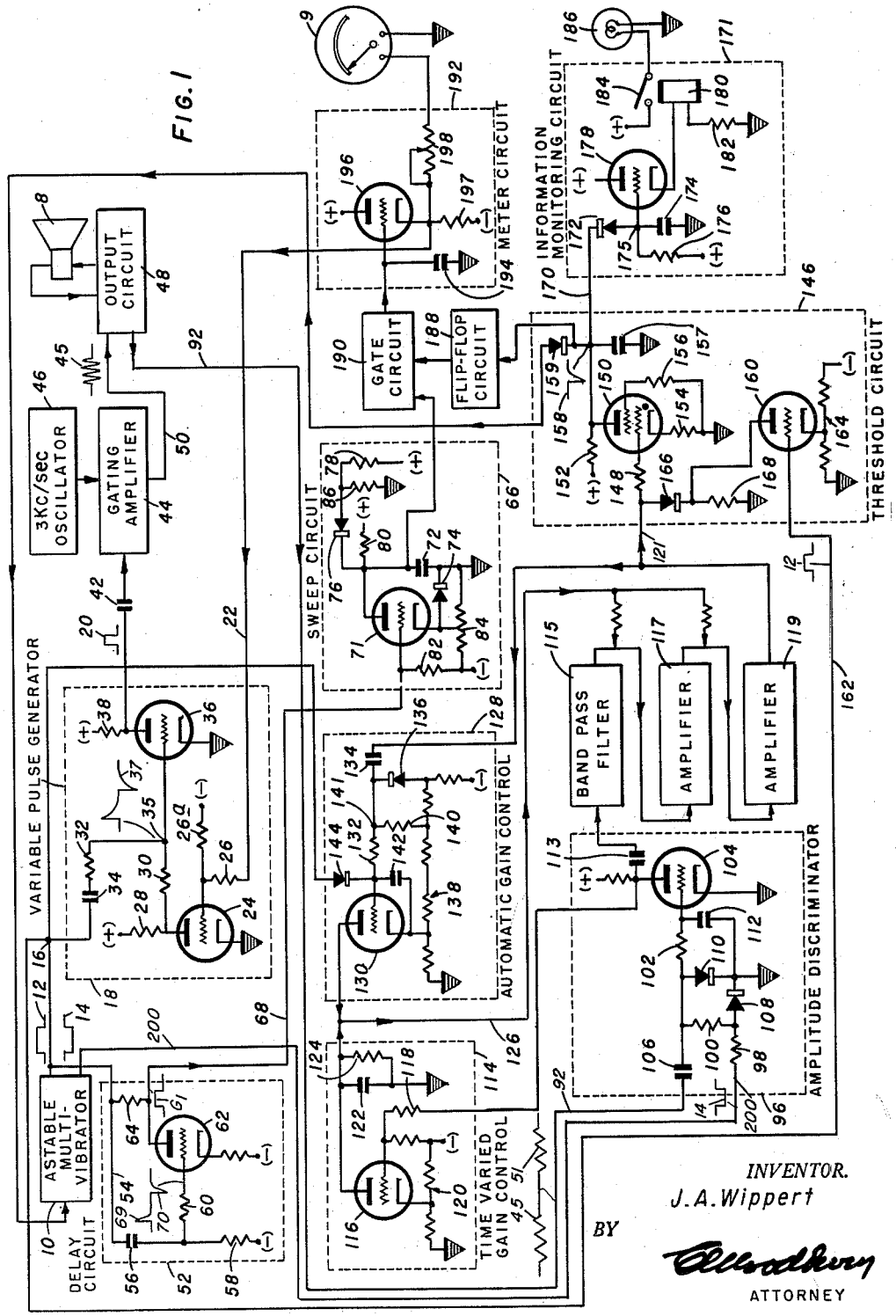

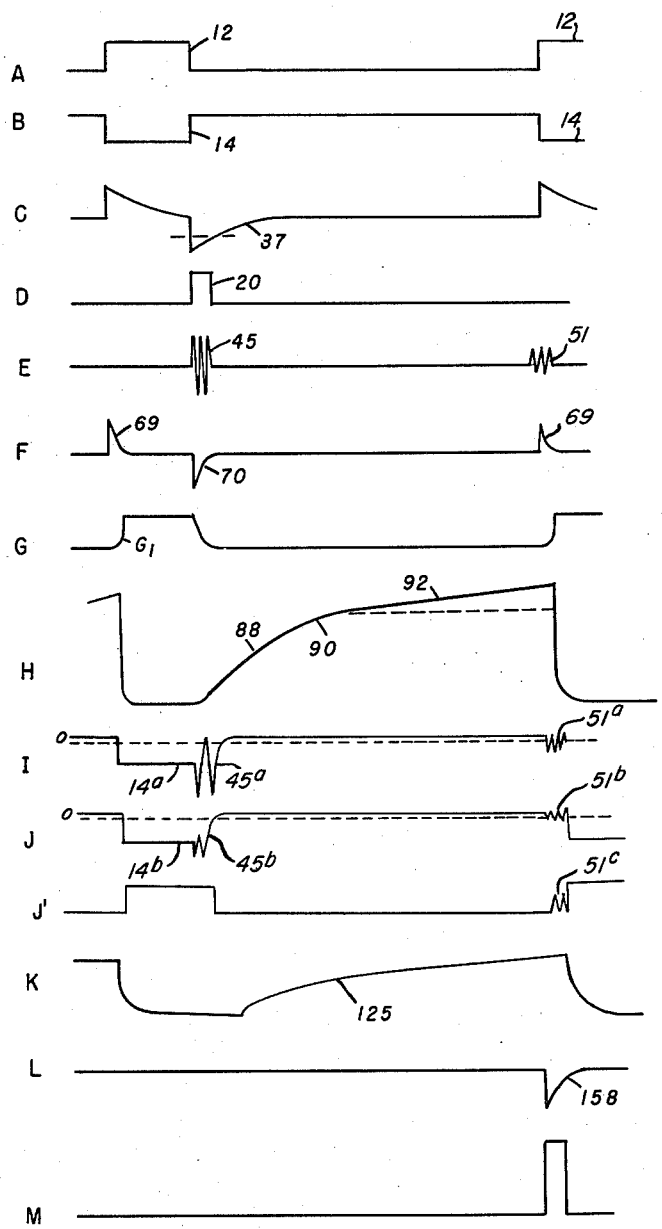

3,102,261
SONIC ALTIMETER
James A. Wippert, Burbank, Calif., assignor to The Bendix Corporation, a corporation of Delaware
Filed Jan. 27, 1958, Ser. No. 711,514
12 Claims. (Cl. 343—5)

This invention relates to sonic altimeters for measuring heights and other distances by means of sound waves.

At various times, as while taking off and landing, it is necessary for all aircraft to operate near the ground. Furthermore, certain types of aircraft, as helicopters, often operate near the ground for extended time intervals. In operating an aircraft near the ground, it is desirable that a pilot be quite accurately informed of his altitude. Under ordinary conditions, an experienced pilot can visually observe his altitude with sufficient accuracy; however, variations in topography may make visual judgment of distances quite inaccurate. Furthermore, weather conditions sometimes make visual observations impossible. Therefore, a need exists for a system which automatically meaures and indicates the altitude of an aircraft relative to the ground, while flying at relatively low altitudes.

It has been previously proposed to accurately measure and indicate the altitude of a low-flying aircraft by transmitting a sound wave, i.e., sonic burst, from the aircraft and observing the time required for an echo to return. One system which utilizes this principle of operation is shown and described in my copending United States patent application Serial No. 554,203, filed December 20, 1955, now Patent no. 3,038,142, isuued June 5, 1962. Although significant advances have been made in the prior sonic altimeters, certain difficulties have remained. For example, prior sonic altimeters have been affected to a substantial degree by false echoes, as those reflected from protuberances on the aircraft. Furthermore, prior sonic altimeters have not measured the interval between the transmission of a sound wave and the detection of an echo as accurately as is desirable, particularly at very low altitudes, and at altitudes near the upper limit of the altimeters.

An object of the invention is to increase the immunity of a sonic altimeter to spurious signals and false echoes.

Another object is to provide a sonic altimeter which transmits a sonic burst of variable duration in accordance with the last-observed altitude, to whereby form a long-duration sonic burst which is more immune to spurious signals when the distance to be traveled is long, and to form a short-duration sonic burst which does not interfere with a rapidly returning echo when the distance to be traveled is short.

Still another object is to provide an improved means for measuring the time interval between sound transmission and echo detection.

A still further object is to provide, in a sonic altimeter, improved means to indicate that the aircraft is operating at a safe altitude.

Briefly, the present invention is an echo distance system for measuring distance or altitude by transmitting a sound wave, and determining the interval required for an echo to return to the point of transmission. The system incorporates several features which result in improved performance. One feature is the transmission of sound pulses of different durations depending upon the altitude of the aircraft, whereby at low altitudes echoes which would otherwise return prior to the termination of the transmitted sound pulse are not lost, but sound pulses of a longer duration are provided when a greater distance is to be traveled.

Another feature is an improved means for measuring the interval between transmission and detection employing a sweep circuit having a condenser and two charging circuits which provides a sweep voltage having a first relatively steep portion and a second portion that is less steep than the first portion but is steeper and more linear than the upper portion of the sweep voltage produced by a conventional sweep circuit having only one charging circuit.

Other and incidental objects and features of the invention will appear from the following description with reference to the drawings, in which:

FIG. 1 is a schematic circuit dliagram of a system incorporating the invention.

FIG. 2 shows the waveforms of signals occurring at various points in the system of FIG. 1 during operation.

Referring now to FIG. 1, there is shown a sonic altimeter having a transducer 8 for transforming between sound and electrical energy, which transducer may be of the vibrating diaphragm type.

In the normal operation of the system, the transducer 8 is caused to transmit a sonic burst which travels to the earth's surface, and is reflected back to the transducer in the form of a sonic echo. Upon receiving the sonic echo, the transducer produces an electrical echo signal, which terminates a time interval that was initiated coincident with the transmitted sonic burst. The duration of the time interval is then manifested by a meter 9 as an indication of altitude.

The construction and operation of a system embodying the present invention is best understood by considering a sequence of operations and carrying the description of the apparatus forward as the description of the mode of operation proceeds.

In FIG. 1, there is shown an astable multivibrator 10 that, when not externally controlled, operates at one-second intervals to generate both a positive pulse 12 and a negative pulse 14, each of 100-millisecond duration. The multivibrator 10 may be triggered by a received echo signal to generate the 100-millisecond pulse at less than one-second intervals. The waveforms from the multivibrator 10, including pulses 12 and 14, are shown respectively in FIGS. 2A and 2B. The astable multivibrator 10 may be the type shown and described beginning on page 171 of volume 19 of the Radiation Laboratories Series, entitled "Waveforms," published by McGraw-Hill.

Variable Pulse Generator

The output line 16 from the multivibrator 10, which carries the pulse 12, is connected to a variable pulse generator 18. The function of the variable pulse generator 18 is to provide pulses 20, of variable length, which determine the duration of the burst of sound transmitted by the system. The duration of the pulses 20 varies as the indicated altitude, so that when an aircraft carrying system is low, the sonic burst of short duration and does not interfere with the echo; however, when the aircraft is a high at altitudes, the sonic burst is of a long duration and produces an echo that is easier to detect in the presence of spurious signals.

The variable pulse generator 18 receives a continuous positive potential from a line 22 the amplitude of which potential varies with the last indicated altitude. This altitude potential is applied to the grid of a tube 24 from the line 22 through a resistor 26. The grid is also connected through a resistor 26 to negative potential which biases the tube to cut-off when the altitude potential is zero. The cathode of the tube 24 is connected to ground, and the plate is connected through a load resistor 28 to positive potential, so that the voltage at the plate of the tube 24 varies inversely as the altitude signal in the line 22. The plate of the tube 24 is connected through the resistors 30 and 32 and condenser 34 to the line 16, so that the condenser 34 is charged during the period of pulse 12. Thereafter, at the occurrence of the trailing edge of the pulse 12, the condenser 34 discharges to produce a voltage having a waveform 37 as shown in FIG. 2C, at the junction 35 between the resistors 30 and 32. The junction 35 is connected to the grid of a grounded cathode, normally-conducting tube 36, and the negative excursion 37 of the voltage at junction 35 causes the tube 36 to be cut off for a short interval until the voltage at junction 35 is restored by current flow through resistor 30, the time being determined by the potential at the plate of the tube 24. The plate of the tube 36 is connected to a source of positive potential through a load resistor 38; therefore, during the interval that the tube is cut off, the pulse 20 (FIG. 2D) is formed at the plate of the tube 36. Of course, the duration of the pulse 20 varies as the voltage on the plate of tube 24, which in turn depends upon the last indicated altitude; therefore, the duration of the pulse 20 may be seen to vary as the last indicated altitude.

The pulse 20 is applied through a coupling condenser 42 to a gating amplifier 44, which is also connected to a 3-kilocycle/second oscillator 46. The gating amplifier 44 functions to pass the oscillating signal only during the interval of pulse 20. The resulting output from the gating amplifier 44, comprising a periodic burst 45 of 3-kilocycle/second oscillations (FIG. 2E), is applied to an output circuit 48 through a line 50. The output circuit 48, which may comprise a transformer, is connected to the transducer 8 and applies the burst signals thereto to produce sonic bursts.

The sonic burst produced by the transducer 8 may strike an object, as the earth, and form an echo which is reflected back to the transducer to produce an electrical echo signal 51 (FIG. 2E). The interval between the time of the sonic burst and the echo signal is measured to indicate the distance which the sound has traveled. In general, this time is measured by producing a sweep signal, i.e., a substantially linearly-increasing signal, and observing the amplitude that the sweep signal attains during the interval between transmission and detection.

Delay Circuit

The previous sweep signal is terminated by the leading edge of the pulse 12 and a new sweep signal is initiated by the trailing edge of the pulse 12. A delay circuit 52 is connected to receive the pulse 12 from the line 16 by a line 54, which is connected through a condenser 56 and resistor 58 to negative potential. The junction between the condenser 56 and the resistor 58 is connected through a resistor 60 to the control grid of a tube 62. The plate of the tube 62 is connected through a resistor 64 to the line 54, and through a line 68 to a sweep circuit 66.

Upon application of the pulse 12 to the condenser 56, the pulse is differentiated to form a signal, as shown in FIG. 2F, at the grid of the tube 62. The differentiated signal includes a positive pulse 69, coinciding in time with the leading edge of the pulse 12, and a negative pulse 70, coinciding with the trailing edge of the pulse 12. The positive pulse 69 causes the tube 62 to conduct upon initially receiving the pulse 12, and temporarily prevents the plate from being driven positive by the simultaneous application of the pulse 12 to the plate through resistor 64. After the passage of the positive pulse 69, the tube 62 is cut off, and the plate of the tube 62 goes positive to form the pulse $G_1$ having a delayed rise as shown in FIG. 2G.

The purpose of delaying the application of the pulse 12 to the sweep circuit 66 is to enable the last prior altitude indication to be metered before the sweep circuit is reset.

Sweep Circuit

The delayed pulse $G_1$ derived from pulse 12 is applied to the sweep circuit 66 through the line 68 which is connected to the grid of a tube 71. The tube 71 has its plate and cathode serially connected with a condenser 72 and a diode 74. The condenser 72 is also connected to a first charging circuit, including a diode 76 and a voltage divider consisting of resistors 86 and 78 connected between the positive source and ground, and to a second charging circuit including a resistor 80 and the positive source. The grid of the tube 71 is connected through a biasing resistor 82 to negative potential, and the cathode of the tube is connected to the variable tap of a potentiometer 84 which is connected between ground and negative potential and serves as a zero adjustment for the sweep circuit.

At a time when the delayed pulse $G_1$ is applied to the grid of the tube 71, the tube is rendered conductive, and the condenser 72 discharges through the tube 71 and the diode 74. The diode is provided to allow the condenser to discharge rapidly by providing a low impedance path in parallel with a portion of the potentiometer 84. With the occurence of the trailing edge of the pulse $G_1$ the tube 71 is cut off, and the condenser 72 begins to charge through the two paths, respectively including: the resistor 80; and the diode 76 and resistors 86 and 78.

The operation of charging a condenser through a resistive circuit is conventional to form a sweep voltage; however, because the condenser charges in an exponential fashion, only the initial portion of the generated sweep voltage approaches linearity. The plurality of charging current paths in sweep circuit 66 provide a sweep voltage which has a steeper slope in its lower portion and which is more linear in its upper portion and also has a steeper slope in its upper portion than does a conventional sweep circuit having only one charging current path.

The initial charging period of the condenser 72 is through both the resistor 80 and the resistor 78 and diode 76. The resistor 78 has a much lower resistance than resistor 80 so that, despite the current bypassed to ground through the resistor 86, the condenser 72 is charged much more rapidly through the lower portion 88 of the sweep curve (FIG. 2H) than it would be charged through the resistor 80 alone. As the potential across the condenser rises, more and more of the current flowing through resistor 78 is diverted from the condenser to the resistor 86 until at the point 90 on the curve the condenser potential equals the potential drop across the resistor 86 with all the current from resistor 78 flowing through it. Without the second charging circuit through the resistor 80, the upper portion of the sweep curve would be substantially flat as indicated by the dotted line in FIG. 2H. However, with the full potential of the positive source applied through the high-resistance resistor 80, charging current continues to flow to the condenser at a slow but substantially constant rate to produce the second portion 92 of the sweep curve having a slope less than that of the portion 88, but relatively constant. The diode 76 prevents current from the resistor 80 being bypassed through the resistor 86.

Thus, the multipath charging circuit produces a sweep potential having a steep slope in the lower portion, which is desirable in a sonic altimeter to provide high sensitivity at low altitudes, while maintaning a lesser but appreciable slope throughout the upper range so that useful indications are still produced at relatively high altitudes.

As a result of the sweep pattern of FIG. 2H, the pointer of meter 9 may move through the first half of its range during the first 50-foot rise in altitude to give extremely accurate readings near the ground, and move substantially linearly through the second half of its range during a subsequent rise from 50 feet to 300 feet. As is customary in altimeters, the scale of the meter 9 is preferably calibrated to fit the sweep pattern and read out the altitude directly in feet or meters.

Simultaneously with the development of the sweep voltage (curve 2H) by the sweep circuit 66, the sonic burst travels from the transducer 8 to the earth and its echo returns. Assuming that the sonic burst produces an echo of sufficient energy to return to the transducer, an echo signal 51 (curve 2E) will be produced. The signal 51 is applied to the line 92 which also receives the transmitted burst signal 45. Therefore, it is necessary to provide a receiving system which selectively passes the echo signal 51, but does not pass the burst signal 45.

The echo signal 51 is considerably attenuated, and is therefore of considerably lower amplitude than the burst signal 45. The amplitude discriminator circuit 96 functions to preserve the echo signal by allowing it to pass while eliminating the burst signal by not permitting it to pass.

*Amplitude Discriminator*

Immediately prior to the time when the burst signal 45 is formed to produce the sonic burst, the negative pulse 14 is applied over line 200 through resistors 98, 100 and 102 to negatively charge a condenser 112, as indicated at 146 in FIG. 2J, and drive the grid of a tube 104 beyond cut off until the occurrence of the burst signal. The cut-off level is indicated by the dotted line in FIG. 2J. When the burst signal 45 appears on the line 92 from the output circuit 48, it is applied to the condenser 106, and during positive half cycles of the signal the anode of the diode 110 is driven positive through the capacitor 106, causing the diode 110 to pass current and charge the capacitor 106. During negative half cycles of the burst signal 45 in the line 92, the diode 110 presents a high impedance to the negative-going signal and therefore does not conduct. As a result, the capacitor 106 is sufficiently charged to clamp the positive peaks of the burst signal at essentially zero potential. The wave form of such a clamped signal is shown at 45a in FIG. 2I, as it appears at the anode of the diode 110 following the direct current negative pulse 14a applied through the resistors 98 and 100. The diode 108 prevents the junction of resistors 98 and 100 from ever going positive in response to any positive potential that may occur on the line 200.

With regard to the burst signal 45 and the echo signal 51, the resistor 102 and the capacitor 112 form an attenuating circuit to reduce the amplitudes of these signals resulting in a waveform as shown in FIG. 2J. From the waveform of FIG. 2J it may be seen that the echo signals 51b attain a higher voltage level than the transmitted burst signals 45b; therefore, ordinary amplitude selection may be employed to preserve the echo signals and eliminate the transmitted burst signals. Such amplitude selection is effected by the vacuum tube 104 which has a cut-off level (the dotted line in FIG. 2J) below at least the positive peaks of the echo signal and above the positive peaks of the burst signal. It is important to note, with reference to FIG. 2J, that it is necessary that the burst signal 45b be completely below the cut-off level of the tube 104, but it is not essential that the echo signal 51b be completely above the cut-off level. The burst signal should be completely blocked, but it is not necessary that all of the echo signal get through.

The burst signal is therefore suppressed, and the echo signal is passed from the amplitude discriminator 96 through a condenser 113 to a band-pass filter 115 which eliminates certain spurious signals by frequency selection. The output at the plate of tube 104 is shown in FIG. 2J'. It is important to note that the tube 104 remains cut off during the burst signal, regardless of the duration of the burst. The output from the filter 115 is applied to an amplifier 117, which is turn coupled to an amplifier 119.

*Gain Control*

When the burst signal is transmitted, echoes may be reflected back to the system from protuberances upon the aircraft, and as a result, false indications may be derived. Therefore it is desirable to disable the receiving system during the interval of the burst signal, and to reduce the sensitivity of the receiver for an interval immediately following the burst signal. To prevent spurious or false-echo signals from being detected by the system, a gain control circuit is provided which initially renders the receiver blocked, then gradually increases the sensitivity of the receiver so that the receiver becomes more sensitive with the passage of time from the instant the sonic burst is transmitted. It is desirable that the degree of sensitivity of the receiver be somewhat proportional to the altitude of the aircraft.

The time-varied gain of the receiver portion of the system of FIG. 1 is effected by the time-varied gain control circuit 114. The circuit 114 includes a tube 116, the grid of which is connected through a resistor 118 to the plate of the tube 104. The tube 116 has a cathode which is connected through a voltage-dividing network 120 so as to receive a negative potential. Normally, the tube 116 is nonconducting; however, during the 100-millisecond interval immediately prior to a sonic burst and during the interval of a sonic burst (when the tube 104 is cut off), the high positive voltage at the plate of the tube 104 (FIG. 2J') drives the grid of the tube 116 sufficiently positive to render it conductive. The tube 116 therefore conducts for an interval in part determined by the duration of the sonic burst. Because the sonic burst varies in duration with indicated altitude, the interval during which the tube 116 conducts also varies with altitude.

Conduction by the tube 116 produces a current to negatively charge a condenser 122 which is in shunt with a resistor 124. The discharge of the condenser 122 occurs through the resistor 124 to produce a rising voltage 125 which starts immediately following the sonic burst, as shown in FIG. 2K.

The voltage developed on the condenser 122, as shown in FIG. 2K is applied to a line 126 and serves to control the sensitivity of the receiver portion of the system by variably biasing the imputs to the amplifiers 117 and 119 so that the sensitivity of the receiver gradually increases from the termination of the sonic burst. Of course, the strength of the echo signal is inversely proportional to the altitude; therefore, at low altitudes the echo signal strength is greater, and the sensitivity of the receiver need not be as great to detect echoes, as at high altitudes.

The receiver portion of the system shown in FIG. 1 may also be subjected to considerable noise; therefore, it is desirable to provide an automatic gain control to vary the gain of the receiver in accordance with the strength of the received signal. This function is effected by the automatic gain control circuit 128. This circuit 128 includes a tube 130, the grid of which is connected through a resistor 132 and a condenser 134 to the output of the amplifier 119. As a result, the conduction of the tube 130 is controlled by the voltage appearing at the output from the amplifier 119, and the voltage at the plate of the tube 130 therefore varies accordingly, and is applied to the line 126 to effect gain control of the amplifiers 117 and 119 in conjunction with the output from the time-varied gain control circuit 114.

The signal applied to the automatic gain control circuit 128 from the amplifier 119 is an alternating-current signal; therefore, to provide steady control of the tube 130 and produce a gain control signal, it is necessary that the A.C. signal be rectified, as by diode 136. The diode 136 is connected at the junction point 141 between the resistor 132 and the condenser 134, and is also connected to a voltage-dividing network 138 which is connected between ground and negative potential. A resistor 140 is also contacted between the junction point 141 and the voltage-dividing network 138. A condenser 142 is connected between the grid and cathode of the tube 130.

In the operation of the automatic gain control circuit, during the period when the tube 104 is completely cut off (immediately prior to and during the transmission of the sonic burst, as shown in FIG. 2J), there is no output from the amplifier 119; therefore, the tube 130 tends to become cut off, thereby enabling the line 126 to become less negative and render the amplifiers 117 and 119 very sensitive. When the tube 104 is again rendered conductive, the amplifiers 117 and 119 would then remain very sensitive and could provide a noise signal adequate to activate the system. To prevent this situation from occurring, a charge is placed upon the condenser 142 by the pulse 12 which passes through a diode 144 connected to the line 16. Therefore, the condenser 142 maintains the tube 130 conductive while the condenser 142 discharges through the resistor 140. Thus the automatic gain control circuit not only provides automatic gain control, but also acts in conjunction with the time varied gain control circuit 114 to render the receiver insensitive to false echoes and noise signals occurring immediately after the sonic burst.

*Threshold Circuit*

After an echo signal has been amplified by the amplifiers 117 and 119, it is applied to a threshold circuit 146. The signal from the amplifier 119 is applied through line 121 and resistor 148 to the control grid of a thyratron 150 in the threshold circuit. The plate of the thyratron 150 is connected through a load resistor 152 to positive potential while the cathode is connected through a resistor 154 to ground. The second grid in the thyraton 150 is connected through a current-limiting resistor 156 to ground. The thyratron 150 is normally cut off; therefore, the plate is positive. Upon receiving the amplified echo signal through the resistor 148, the thyratron 150 is rendered conductive, thereby producing a negative pulse 158 at its plate as a condenser 157 connected between the thyratron plate and ground is discharged. The waveform of the voltage at the plate of the thyratron 150 is shown in FIG. 2L.

In the operation of the receiver portion of this system, as previously described, the tube 104 (in the amplitude discriminator 96) is completely cut off prior to the transmission of the sonic burst. At the time when the tube 104 is cut off (point 14b in FIG. 2J), a positive voltage is formed at the plate which is applied through the condenser 113 to the band-pass filter 115. This change in voltage may be of sufficient magnitude to ring the filter 115 and produce an alternating signal that passes through the amplifiers 117 and 119 and triggers the thyratron 150. Due to the delay incurred by this transient in the filter 115, the danger of false triggering occurs during the interval of the pulse 12; therefore, the pulse 12 is employed to render the thyratron 150 temporarily inoperative. The pulse 12 is applied to a tube 160 in the threshold circuit 106 through a line 162. The tube 160 has a cathode connected to a voltage-dividing network 164 so as to receive a negative potential, and a plate connected to a junction point between a diode 166 and a resistor 168. The diode 166 and the resistor 168 are connected between the line 121 and ground. During the period of the pulse 12, the grid of the tube 160 is driven positive, thereby rendering the tube 160 conductive through the resistor 168 to drive the line 121 more negative through the diode 166. As a result, spurious signals which appear upon the line 121 during the interval of the pulse 12 are not capable of triggering the thyratron 150 in to a false operation.

The operation of the thyratron 150 in conjunction with the condenser 157 to form a negative pulse 158 has several effects. The amplitude of the sweep voltage is sensed to meter the present altitude; a monitor circuit is controlled to indicate that the system is receiving altitude information; and the astable multivibrator 10 is triggered to start another cycle of operation.

*Monitoring Circuit*

The pulse 158 is applied through a line 170 to a serially-connected diode 172 and condenser 174 in the information-monitoring circuit 171. The condenser 174 is connected to ground. The junction point 175 between the diode 172 and the condenser 174 is connected to a source of positive voltage through a resistor 176, and to the control grid of a tube 178. The plate of the tube 178 is connected to positive potential, and the cathode is connected through a relay 180 and a resistor 182 to ground. The contacts 184 of the relay 180 are serially connected with a light bulb 186 between positive potential and ground.

During the interval after a sonic burst is transmitted, the condenser 174 in the monitoring circuit charges through the resistor 176 toward a level at which the tube 178 becomes more conductive; however, when the thyratron 150 conducts, the charge on the condenser 174 is dissipated through the diode 172 and resistor 154, and therefore the tube 178 becomes less conductive. However, when no echo signals are received during the period of a few seconds, the charge on the condenser 174 becomes adequate to drive the tube 178 sufficiently conductive to energize the relay 180 through the resistor 182, close the contacts 184, and illuminate the lamp 186. As a result, the lamp 186 is illuminated during intervals when the altitude is beyond the range of the altimeter. The use of the relay 180 may also be extended to provide audio signals as well as other visual indications.

*Altitude Indicator Circuits*

The pulse 158 from the threshold circuit 146 is also applied to a flip-flop circuit 188 which is in turn connected to a gate circuit 190. The flip-flop circuit 188 may comprise a single-shot multivibrator as shown and described in the above-referenced book. The gate circuit 190 may take various forms, one of which is shown and described in the above-referenced patent application. The flip-flop circuit 188 functions to render the gate circuit 190 operative during a precise interval to pass a signal indicative of the present charge on the condenser 72. Of course, this charge constitutes the sweep signal, and the amplitude thereof is indicative of altitude. The altitude-indicating signal sampled by the gate circuit 190, as shown in FIG. 2M, is stored upon a condenser 194 which controls the conduction of the tube 196 in the meter circuit 192. The tube 196 is connected in a cathode-follower fashion, having a plate connected to positive voltage and a cathode connected through a resistor 197 to negative potential. The cathode of the tube 196 therefore follows the voltage at the grid of the tube to provide a voltage indicative of altitude. The voltage at the cathode of the tube 196 is applied through a variable resistor 198 and the meter 9 to ground. As a result, the voltage developed on the condenser 194 is manifested by the meter 9, indicating the altitude.

*Initiation of New Cycle*

The negative pulse 158 is applied to the multivibrator 10 through a diode 159 and triggers the multivibrator to form a pulse 12, thereby starting another cycle of operation. It is important to note that a new pulse 12 is initiated immediately by the pulse 158, and the new pulse 12 promptly terminates any remaining portions of the echo-produced signals 51a, 51b, 51c, in FIGS. 2I, 2J and 2J'. The pulse 158 occurs as soon as the amplified pulse 51c builds up sufficiently to trigger the thyratron 150, which firing may be during the first or a subsequent positive half-cycle of the amplified A.C. pulse 51c. However, the sweep voltage (FIG. 2H) continues for a short time following initiation of the new pulse 12 to insure operation of the altitude indicator circuit.

To consider the over-all operation of the system in general, and thereby summarize the previous description, it may be seen that the multivibrator 10 operates to provide pulses 12 and 14. The operation of the multivibrator in the absence of received altitude information will be at one-second intervals, and during receipt of altitude information will be more frequent and determined by the altitude.

The pulse 12 from the multivibrator 10 is applied through the variable pulse generator 68 to develop a pulse (the length of which is proportional to the indicated altitude) which is applied to a gating amplifier 44 to gate a burst of oscillations from the oscillator 46 to the output circuit 48, and thus to the transducer 8. With the transmission of the sonic burst, a timing operation involving the charging of a condenser is started to determine the distance traveled by the sound wave. The echo of the transmitted sonic burst is detected by the transducer 8, applied through the output circuit 48 and the line 92 to the amplitude discriminator 96. The amplitude discriminator 96 functions to render the receiving system inoperative during the transmission of the sonic burst regardless of the duration of the burst which varies with the last indicated altitude. From the amplitude discriminator 96 the echo signal is applied to the filter 115 to be filtered and thereafter amplified by amplifiers 117 and 119. The signal is then applied to the threshold circuit 146 to develop a pulse 158 which is returned to the multivibrator 10 to initiate another cycle of operation; applied to the information-monitoring circuit 171 to control a light 186 in accordance with whether or not information is being received; and applied to the flip-flop circuit 188 to operate the gate circuit 190 and deposit a charge on the condenser 194 indicative of altitude, which is manifested by the meter 9.

It may therefore be seen that this invention provides an improved sonic altimeter fully capable of achieving the objects herein previously set forth.

Although for the purpose of explaining the invention particular embodiments thereof have been shown and described, obvious modifications will occur to a person skilled in the art, and I do not desire to be limited to the exact details shown and described.

I claim:

1. An echo distance-measuring device comprising:
   means for successively transmitting bursts of traveling wave energy;
   detecting means for detecting an echo of each said burst;
   indicating means for manifesting distance;
   time-measuring means responsive to each transmitted burst and its echo for setting said indicating means in accordance with the duration of the echo interval between the transmission of each burst and detection of the echo thereof;
   and means for controlling the duration of each said burst in accordance with the duration of the preceding echo interval as indicated on said indicating means;
   said detecting means including: a transducer for converting said echo into an electrical echo signal, amplifier means for amplifying said electrical echo signal, automatic gain control means for regulating the gain of said amplifier means in accordance with the signal strength received by said amplifier means, and means for reducing the gain of said amplifier means during the transmission of a burst of traveling wave energy.

2. An echo distance-measuring device comprising:
   means for successively transmitting bursts of traveling wave energy;
   detecting means for detecting an echo of each said burst;
   indicating means for manifesting distance;
   time-measuring means responsive to each transmitted burst and its echo for setting said indicating means in accordance with the duration of the echo interval between the transmission of each burst and detection of the echo thereof;
   means for controlling the duration of each said burst in accordance with the duration of the preceding echo interval as indicated on said indicating means;
   control means for setting the sensitivity of said detecting means at a low sensitivity level, to thereafter gradually increase, said control means functioning during the transmission of a burst; and
   means for varying the duration of said low-sensitivity level in accordance with the duration of said interval.

3. An echo distance-measuring device comprising: means for transmitting a burst of traveling wave energy; detecting means for detecting an echo of said burst; indicating means for manifesting distance; means for setting said indicating means in accordance with the duration of the interval between the transmission of said burst and detection of said echo; control means for setting the sensitivity of said detecting means at a low-sensitivity levl, to thereafter gradually increase, said control means functioning during the transmission of a burst; and means for varying duration of said low-sensitivity level in accordance with the duration of said interval.

4. An echo distance-measuring device comprising: means for transmitting a burst of traveling wave energy; transducer means for detecting said echo to form an electrical echo signal; amplifier means for amplifying said echo signal; automatic gain control means for regulating the gain of said amplifier means in accordance with the signal strength received by said amplifier means; means for reducing the gain of said amplifier means during the transmission of a burst of traveling wave energy; indicating means for manifesting distance; and means connected to said amplifier means for setting said indicating means in accordance with the duration of the interval between the transmission of said burst and detection of said echo.

5. A sweep generator comprising: a capacitor; a high potential charging circuit having high impedance; a low potential charging circuit having low impedance; means connecting said high potential charging circuit to said capacitor to charge it; means including a unilaterally conductive device connecting said low potential charging circuit to said capacitor to charge it; said unilaterally conductive device being poled to conduct charging current from said low potential charging circuit to said capacitor and prevent reverse flow, whereby said capacitor is charged from both said charging circuits until the capacitor potential rises to the potential of said low potential charging source and thereafter from said high potential charging circuit only.

6. Apparatus according to claim 5 in which said high potential charging circuit comprises a potential source and a high impedance conductive element in series therewith, and said low potential charging circuit comprises a passive voltage dividing network connected in shunt to said source.

7. In an echo distance measuring device having means for transmitting a burst of traveling wave energy and means for receiving an echo of said burst, indicating means for indicating the time interval between said burst and said echo comprising: means for generating a rising voltage having a first portion rising substantially linearly from a first level at the instant of transmission of said burst to a second level within a fixed time interval and a second portion rising substantially linearly from said second level following said fixed interval, said first portion of said rising voltage having a more rapid rate of rise than said second portion; and means responsive to reception of said echo for indicating the total magnitude of rise of said rising voltage from said first level at the time of said reception; said rising voltage generating means comprising a condenser, the voltage across which constitutes said rising voltage, and variable-resistance charging means variable in response to an increase in the voltage across the condenser to said second level for charging said condenser at a rapid rate to said second level and at a slower rate above said second level.

8. Apparatus according to claim 7 in which said charging means comprises: a first charging means consisting of a variable voltage source the maximum voltage of which corresponds substantially to said second voltage level, and having relatively low resistance; a second charging means connected in parallel to said first charging means and consisting of a voltage source of voltage substantially higher than said maximum voltage and having relatively high resistance; and means for electrically isolating said first charging means of said condenser in response to rise of the condenser voltage above said maximum voltage.

9. Apparatus according to claim 8 in which said isolating means comprises a unidirectional conducting device connecting said first charging means to said condenser.

10. Apparatus according to claim 8 in which said first charging means comprises a voltage source of voltage substantially higher than said maximum potential and a resistive voltage-dividing network connected in shunt thereto.

11. An echo distance-measuring device comprising:
means for successively transmitting bursts of traveling wave energy;
detecting means for detecting an echo of each of said bursts;
indicating means for manifesting distance comprising a capacitor for storing a potential, and a potential-indicating device connected to said storage capacitor;
means responsive to each transmitted burst for generating a potential rising at a predetermined time rate from a predetermined base value;
gating means actuated by each detected echo for connecting said voltage-generating means to said capacitor to charge said capacitor to the potential corresponding to the time interval between said echo and the burst that caused it;
and means for determining the duration of each of said bursts in accordance with the magnitude at that time of the potential stored on said capacitor.

12. Echo distance-measuring apparatus comprising: means adapted to be triggered to generate a first voltage pulse of fixed duration having leading and trailing ends; means responsive to said first pulse for generating a second, shorter pulse having a leading end delayed with respect to that of the first pulse and a trailing end coincident with that of the first pulse; a sweep voltage generator controlled by said second pulse and responsive thereto to deliver a voltage of fixed base value throughout the duration of said second pulse and a rising voltage beginning at the end of the second pulse; burst signal-transmitting means controlled by said first pulse for transmitting a burst of traveling wave energy at the trailing end of said first pulse; echo-receiving means for generating a trigger pulse in response to reception of an echo; means responsive to said trigger pulse for triggering said first pulse-generating means to generate a new first pulse; and means responsive to said trigger pulse for indicating the instantaneous magnitude of said rising voltage.

References Cited in the file of this patent
UNITED STATES PATENTS

| | | |
|---|---|---|
| 2,083,344 | Newhouse | June 8, 1937 |
| 2,167,492 | Sproule | July 25, 1939 |
| 2,337,905 | Livingston | Dec. 28, 1943 |
| 2,427,523 | Dolberg | Sept. 16, 1947 |
| 2,446,960 | Seebinger | Aug. 10, 1948 |
| 2,466,539 | Evans | Apr. 5, 1949 |
| 2,519,898 | Gardener | Aug. 22, 1950 |
| 2,542,983 | Beatly | Feb. 27, 1951 |
| 2,551,595 | Grieg | May 8, 1951 |
| 2,890,437 | Dudley | June 9, 1959 |
| 2,903,584 | Jaffee et al. | Sept. 8, 1959 |
| 2,946,050 | Wathen | July 19, 1960 |
| 2,981,942 | Gross | Apr. 25, 1961 |

FOREIGN PATENTS

| | | |
|---|---|---|
| 1,121,949 | France | May 14, 1956 |